UNITED STATES PATENT OFFICE 2,014,433

AZO DYE

Richard Frank Goldstein, Prestwich, England, assignor to Imperial Chemical Industries Limited, a corporation of Great Britain No Drawing. Application June 2, 1932, Serial No. 615,042. In Great Britain June 24, 1931

10 Claims. (Cl. 260—76)

This invention relates to organic compounds and more particularly refers to azo dyes having exceptional resistance to kier-boiling and to chemic, and methods for their preparation.

It is an object of this invention to produce an azo dye having exceptional resistance to kier-boiling and to chemic. A further object is to produce an azo dye which may be coupled on the fiber giving bright green shades. Additional objects will appear hereinafter.

These objects are accomplished by the present invention wherein the material to be dyed is treated with a diacylacetyl derivative of a diamine, the treated material thereafter being immersed in a diazo solution of a diamino thioindigo, preferably the 5-5'-diamino thioindigo.

The term "diacylacetyl derivative" includes the compounds described in British Patents Nos. 211,772 and 384,317, namely arylamides obtained by interacting diamines of the benzidine or other series, having the two amino groups in different nuclei, with acylacetic esters, such as acetoacetic and benzoylacetic esters.

These compounds may be represented by the general formula

R—CO—CH₂—CO—NH—X—
 NH—CO—CH₂—CO—R wherein R stands for alkyl or aryl, while X stands for the divalent residue of a diphenyl compound of the group comprising diphenyl itself and its homologs and compounds wherein two phenyl nuclei are joined together by a link such as —O—, —S—, —CH₂—, —CH=CH—, —CO—, —NH—, —NH—CO—, —N=N—,

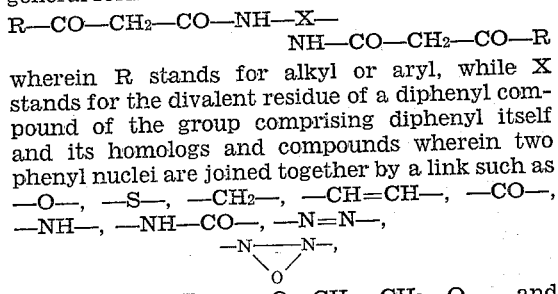

—NH—CO—NH—, —O—CH₂—CH₂—O—, and the like.

The diamines should preferably not contain groups rendering the compound soluble in water, such as sulfo and carboxyl.

The invention may be more readily understood by reference to the following examples:

Example 1

1.63 grams of 5-5'-diamino thioindigo were dissolved in 25 grams of concentrated sulfuric acid (sp. gr. 1.84) by agitating at room temperature for 1 hour: 0.81 gram of sodium nitrite were cautiously introduced and agitation continued for 2 hours until a drop of the solution gave, on dilution with water, a clear red solution.

The sulfuric acid solution of the diazotized diamino thioindigo was then poured with stirring on to a mixture of crushed ice and water. The excess of sulfuric acid was carefully neutralized to litmus with precipitated chalk, the volume made up to 500 cc., and 500 cc. of a solution containing 50 grams sodium chloride per litre and 25 cc. 10% aluminum sulfate solution per litre added.

Cotton hanks were immersed for half an hour at 30–35° C. in a grounding liquor prepared by dissolving: 1.5 parts bis acetoacetyl-o-tolidine, 9 parts Turkey red oil, and 2.25 parts caustic soda solution, 70° Twad., in 50 parts boiling water followed by bulking to 1000 parts with water, and addition of 50 parts sodium chloride.

The hanks were removed, squeezed and immersed in the diazo solution prepared above. After ½ hour, the hanks were removed and rinsed thoroughly in cold water. The color, which was rapidly produced, was a bright yellowish-green which was turned yellower and brighter by a soap boiling treatment with 3 grams soap and 2 grams soda ash in a litre of water.

The shades possessed excellent fastness to open caustic soda kier-boiling when tested by the method of Rowe (J. S. D. C., 1931, page 30), and the kier-boiled colors possessed good fastness to chemic.

Example 2

A diazo solution of 5-5'-diamino thioindigo was prepared as in Example 1.

Cotton hanks were immersed in a grounding bath containing 2 grams per litre of bis acetoacetyl-4-4'-diaminostilbene prepared as described in British Patent No. 384,317.

The hanks were removed, squeezed and immersed in the tetrazo-thioindigo solution for half an hour. On rinsing, green shades were produced, slightly yellower than those obtained in Example 1, and possessing equal fastness properties.

Material is dyed by the process of this invention in beautiful bright green shades. These shades are exceptionally fast and stand up exceedingly well when subjected to kier-boiling. The coupling on the fiber is exceptionally rapid so that this process is very well adapted to warp dyeing.

As many apparently widely different embodiments of this invention may be made without departing from the spirit and scope thereof, it is to be understood that I do not limit myself to the specific embodiments thereof except as defined in the appended claims.

I claim:

1. The process of producing an azo dye which comprises tetrazotizing 5,5'-diamino-thioindigo and coupling the tetrazo compound to a bis-acylacetyl-aromatic diamine comprising two phenylene nuclei and having one amino group located in each nucleus.

2. The process of producing an azo dye which comprises tetrazotizing 5,5′ diamino-thioindigo and coupling the tetrazo compound to a bis-acetoacetyl aromatic diamine of the group consisting of benzidine, diamino-stilbene, and homologs thereof.

3. An azo dye being substantially identical with the product obtainable by coupling a tetrazotized 5,5′ diamino-thioindigo with a diacylacetyl-diarylene-diamide.

4. An azo dye being substantially identical with the product obtainable by coupling tetrazotized 5,5′-diamino-thioindigo with a diacylacetyl-diarylene-diamide of the general formula

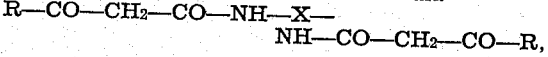

wherein R stands for methyl or phenyl, while X stands for the divalent residue of diphenyl, stilbene, or homologs thereof.

5. The azo dye obtainable by coupling tetrazotized 5,5′-diaminothioindigo with bis-acetoacetyl-o-tolidine.

6. The azo dye obtainable by coupling tetrazotized 5,5′-diaminothioindigo with bis-acetoacetyl-4,4′-diamino-stilbene.

7. Textile fiber dyed with a compound as defined in claim 3.

8. Textile fiber dyed with a compound as defined in claim 4.

9. Textile fiber dyed with a compound as defined in claim 5.

10. Textile fiber dyed with a compound as defined in claim 6.

RICHARD FRANK GOLDSTEIN.